United States Patent

Mahowald

(10) Patent No.: US 8,295,711 B2
(45) Date of Patent: Oct. 23, 2012

(54) FREQUENCY-AGILE INFRARED RECEIVER

(75) Inventor: Peter H. Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 890 days.

(21) Appl. No.: 12/234,587

(22) Filed: Sep. 19, 2008

(65) Prior Publication Data

US 2010/0074631 A1   Mar. 25, 2010

(51) Int. Cl.
*H04B 10/06* (2006.01)
(52) U.S. Cl. .................................................. 398/202
(58) Field of Classification Search ............. 455/296, 455/150.01; 398/115
See application file for complete search history.

(56) References Cited

U.S. PATENT DOCUMENTS

| | | | |
|---|---|---|---|
| 5,684,294 A * | 11/1997 | Kouhi | 250/214 AL |
| 5,786,921 A | 7/1998 | Wang et al. | |
| 6,049,294 A | 4/2000 | Cho | |
| 6,812,466 B2 * | 11/2004 | O'Connor et al. | 250/341.1 |
| 7,415,264 B2 * | 8/2008 | Ismail et al. | 455/339 |
| 2005/0047794 A1 | 3/2005 | Quintanar | |
| 2005/0190073 A1 | 9/2005 | Berges et al. | |
| 2007/0205914 A1 | 9/2007 | Choi et al. | |
| 2009/0306487 A1* | 12/2009 | Crowe et al. | 600/322 |

* cited by examiner

*Primary Examiner* — Yuanda Zhang
*Assistant Examiner* — Tuan Nguyen
(74) *Attorney, Agent, or Firm* — Kramer Levin Naftalis & Frankel LLP

(57) ABSTRACT

An infrared receiver is provided that may include an infrared sensor, a band-pass filter, and a processor. The processor may be configured to transmit a confirmation signal to the band-pass filter if the signal is distinguishable from noise.

16 Claims, 3 Drawing Sheets

FREQUENCY-AGILE INFRARED RECEIVER

FIELD OF THE INVENTION

The invention relates to an infrared receiver and, more particularly, to an infrared receiver having a dynamically responsive band-pass filter.

BACKGROUND OF THE DISCLOSURE

Many consumer electronic devices are equipped with an infrared receiver to facilitate remote operation with an infrared remote control. The infrared receiver is generally designed to receive infrared signals modulated at a predetermined carrier frequency. The carrier frequency, however, is non-standard in that it can vary from receiver to receiver, ranging from 30 kHz to 60 kHz. The lack of a standard modulation frequency can result in inconsistent operation of remotely controlled devices. For example, an infrared receiver designed to receive infrared signals modulated at 38 kHz may not respond to infrared signals modulated at 36 kHz.

One approach to solving this problem involves designing the infrared receiver to accept modulated signals at a wider range of frequencies, but this makes the receiver more sensitive to interference from external sources, such as fluorescent lighting or plasma televisions. An infrared receiver is needed with optimum sensitivity afforded by narrow band operation but with the ability to accept a wide range of modulation frequencies.

SUMMARY OF THE DISCLOSURE

Embodiments of the invention relate to an infrared receiver that may include a sensor, a band-pass filter, and a processor. The processor may be configured to transmit a confirmation signal to the band-pass filter if the signal is distinguishable from noise.

Some embodiments of the invention relate to a method for receiving infrared signals that may include receiving an infrared signal having a modulation frequency, filtering the infrared signal based on a center frequency, and updating the center frequency based on the modulation frequency.

Some embodiments of the invention relate to a band-pass filter that may include an input module, a filter processing module, and a filter module, where the filter module has a center frequency. The input module may be configured to receive an infrared signal modulated at a carrier frequency. The filter processing module may be configured to update the center frequency based on the carrier frequency if a confirmation signal is received, where the confirmation signal indicates the infrared signal comprises a predetermined transmission format.

Some embodiments of the invention relate to a computer program product for filtering a signal. The computer program product may include instructions for receiving a signal modulated at a carrier frequency and changing a band-pass filter setting if a confirmation signal is received.

BRIEF DESCRIPTION OF THE DRAWINGS

The above and other aspects and features of the invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
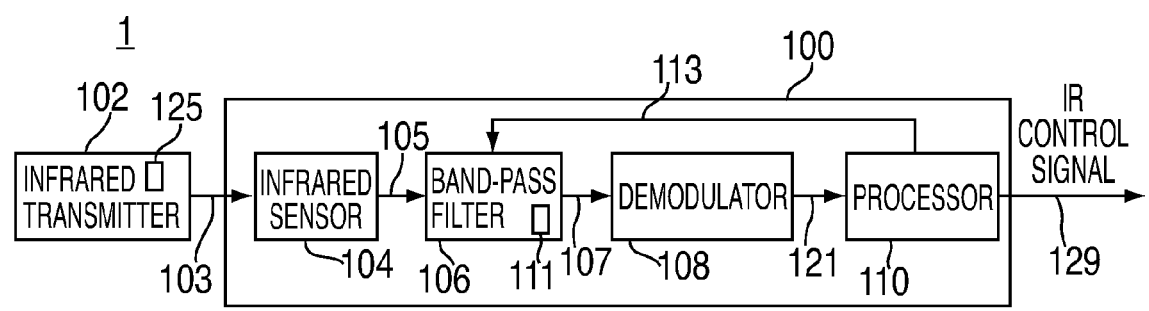
FIG. 1 is a functional block diagram of a system including an infrared receiver according to some embodiments of the invention.

Embodiments of the invention relate to a dynamically responsive infrared receiver, wherein the infrared receiver can adapt its center frequency based on the incoming carrier frequency.

In the following discussion of illustrative embodiments, any reference to a particular frequency includes frequencies and frequency bands that are "about" the stated frequency and may be slightly higher or slightly lower than the stated frequency. The terms "coupled to" and "in communication with," refer to, without limitation, any connection or coupling, either direct or indirect, between two or more elements whether physical, logical, electrical, or a combination of these. The terms "modulated frequency" and "carrier frequency" are used interchangeably to refer to a waveform modulated with an input signal for the purposes of conveying information. The terms "a," "an," and the singular forms of words shall be taken to include the plural form of the same words, such that the terms mean that one or more of something is provided. The terms "comprising," "including," and "having," as used in the claims and specification herein, shall be considered as indicating an open group that may include other elements not specified. The term "based on," as used in the claims and specification herein, is not exclusive and allows for being based on additional factors that may or may not be described. The term "automatic," as used herein, means without human intervention.

It is to be understood that the figures and descriptions of the invention have been simplified to illustrate elements that are relevant for a clear understanding of the invention while eliminating, for purposes of clarity, other elements. For example, details relating to the demodulation of an infrared signal by separating the carrier component from the signal or the decoding of the demodulated signal are not described herein. Similarly, certain details relating to receiver hardware, such as amplifiers and integrators, are not described herein. A discussion of these elements is not provided because they are well known in the art and because they do not facilitate a better understanding of the invention. For a general understanding of the features of the invention, reference is made to the drawings, wherein like reference numerals have been used throughout to identify similar elements.

FIG. 1 is a functional block diagram of a system 1 for practicing some embodiments of the invention. System 1 includes an infrared receiver 100 and an infrared transmitter 102. Receiver 100 includes an infrared sensor 104, a band-pass filter 106 tuned to a center frequency 111, a demodulator 108, and a processor 110. In operation, infrared sensor 104 may receive from transmitter 102 an infrared signal 103 modulated at a carrier frequency 125. Infrared sensor 104 may generate an electric signal 105 that may have embedded control signals (i.e., a series of infrared sequences that correspond to certain commands). Band-pass filter 106 may receive electric signal 105 and then transmit a filtered signal 107 to demodulator 108. Demodulator 108 may be configured to remove or separate carrier signal 123 from filtered signal 107 and output a clean digital control signal 121 to processor 110. Processor 110 may identify clean digital control signal 121 as corresponding to a predetermined transmission format and transmit a confirmation signal to band-pass filter 106 via feedback loop 113. After receiving the confirmation signal, band-pass filter 106 may update center frequency 111 to operationally match the identified carrier frequency 125. Processor 110 may also generate an electronic signal 129, which may be input into a logic circuit configured to perform some remote function (e.g., powering up a television).

Infrared transmitter 102 may be any device capable of generating infrared signals (e.g., infrared signal 103), such as a television remote control or any other handheld device equipped with an infrared light emitting diode. In some embodiments, infrared transmitter 102 may be configured to encrypt, modulate, and transmit control information, such as to infrared receiver 100.

Infrared sensor module 104 may include any sensor capable of detecting infrared signals, such as infrared signal 103 modulated at carrier frequency 125. Infrared sensor module 104 may also be configured to transmit electric signals, such as electric signal 105, based on the infrared signal received.

Band-pass filter 106 may be any device configured to transmit a band of frequencies centered around center frequency 111 and to reject substantially all other frequencies. Center frequency 111 may be set by, for example, a tri-state input, or by an analog input, or by I2C bus commands.

Demodulator 108 may be any device configured to remove or separate a control signal from a carrier signal.

Processor 110 may be a processor, an application-specific integrated circuit (ASIC), or any combination thereof. Processor 110 may, for example, include circuitry configured to distinguish an actual transmission from other interfering transmissions, such as by comparing the received signal with a predetermined transmission format. Processor 110 may also be configured to decode infrared signals. While infrared receiver 100 is illustrated with a single processor, those skilled in the art will appreciate that an infrared receiver may include multiple processors and/or coprocessors.

Figure 2:
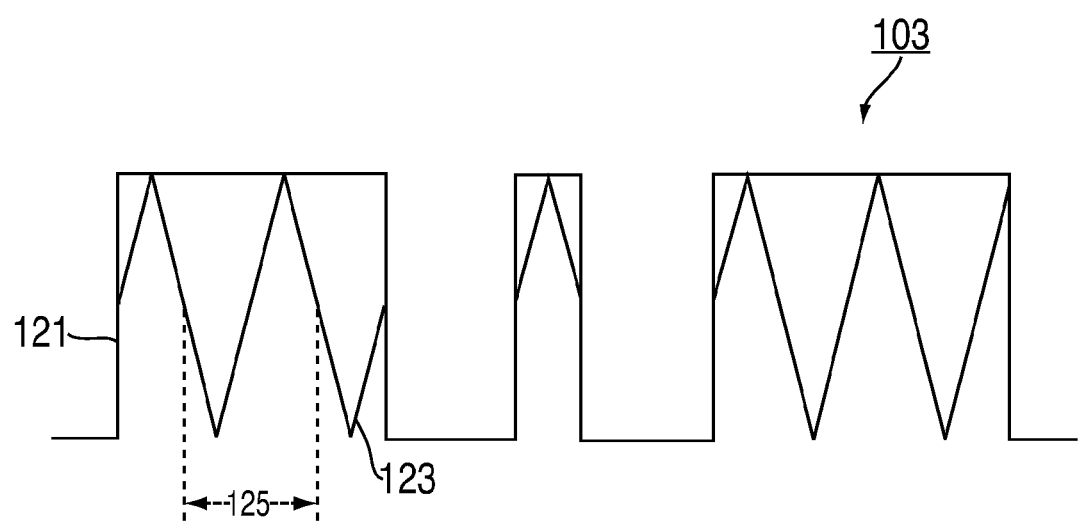
FIG. 2 is a schematic diagram of an exemplary infrared signal.

FIG. 2 is a schematic diagram of infrared signal 103 that may be received by some embodiments of the invention. According to some embodiments, infrared signal 103 may have a predetermined transmission format including a digital control signal 121 and a carrier wave 123 generated at carrier frequency 125. Digital control signal 121 may include a series of infrared sequences that correspond to certain commands (e.g., channel up=0011001, channel down=00110010, volume up=00110101, volume down=00110110). Carrier frequency 125 may be set by infrared transmitter 102.

Figure 3:
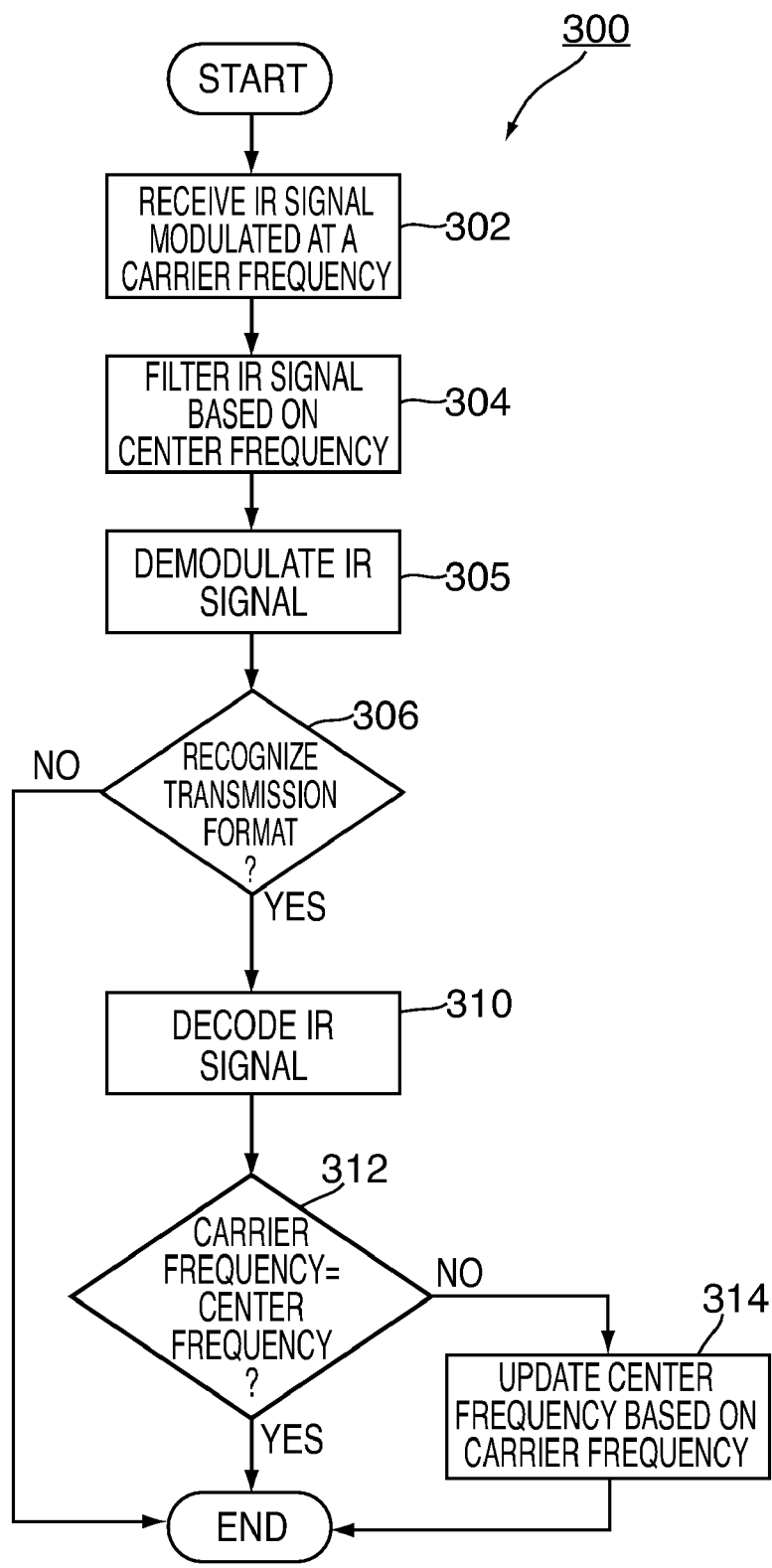
FIG. 3 is a process diagram of an exemplary method for receiving an infrared signal according to some embodiments of the invention.

FIG. 3 is a process diagram of an exemplary method 300 for operating a frequency-agile infrared receiver, such as infrared receiver 100, according to some embodiments of the invention. In step 302, an infrared sensor may receive an infrared signal modulated at a carrier frequency and then may generate a predetermined electric signal that includes control signals. For example, infrared sensor 104 may receive infrared signal 103 modulated at carrier frequency 125 and then generate a predetermined electric signal 105. Signal 105 may be fed to band-pass filter 106, which may have a default center frequency 111, such as 38 kHz. Infrared transmitter 102, however, may have a different default carrier frequency 125, such as 36 kHz. Those skilled in the art will appreciate that an infrared receiver with a center frequency of 38 kHz may recognize signals transmitted from an infrared transmitter with a 36 kHz frequency if the distance between the transmitter and the receiver is sufficiently small (i.e., the strength of the infrared signal is sufficiently high).

In step 304, a band-pass filter may reject all signals outside the pass-band centered on a certain center frequency and then feed a filtered signal to a demodulator. For example, band-pass filter 106 may reject signals outside the pass-band centered on center frequency 111 and may feed a filtered signal 107 to demodulator 108.

In step 305, the demodulator may demodulate the filtered signal and generate a clean digital control signal (i.e., without the carrier signal). For example, demodulator 108 may demodulate filtered signal 107 and generate a clean digital control signal 121 without carrier signal 123.

In step 306, the digital control signal generated in step 305 may be evaluated to determine whether it has a predetermined transmission format. For example, processor 110 may contain circuitry to determine whether digital control signal 121 contains a threshold number of bytes that are received and understood. This technique may be useful to distinguish actual infrared transmissions from noise. If the threshold number of bytes is not recognized, for example, then digital control signal 121 may be considered noise, rather than an intentional control signal transmission, and method 300 ends. If the threshold number of bytes is recognized and understood, digital control signal 121 may be decoded in step 310, which translates the series of infrared sequences represented by digital control signal 121 into certain commands.

In step 312, the processor may feed back to the band-pass filter with a confirmation signal to update the band-pass center frequency. The confirmation signal may include an indication that a predetermined transmission format has been received. For example, processor 110 may feed back to band-pass filter 106 via feedback loop 113. After receiving the confirmation signal that a predetermined transmission format has been received, the band-pass filter may compare the carrier frequency to the center frequency to determine whether the center frequency should be updated. If the center frequency and carrier frequency are operationally equivalent, then process 300 ends without updating the center frequency. If the center frequency differs, operationally, from the carrier frequency, the center frequency may be updated in step 314. For example, if carrier frequency 125 is 36 kHz and center frequency 111 is 38 kHz, band-pass filter 106 may update center frequency 111 from 38 kHz to 36 kHz. Updating center frequency 111 may improve the sensitivity of infrared receiver 100 to infrared signals modulated at 36 kHz. In some embodiments the updated center frequency may be stored in a non-volatile storage so that, if the receiver is powered up again, the center frequency is already set to the updated value.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

One of ordinary skill in the art should appreciate that the invention may take the form of an entirely hardware embodiment or an embodiment containing both hardware and software elements. In particular embodiments, such as those embodiments that relate to methods, the invention may be implemented in software including, but not limited to, firmware, resident software, and microcode.

One of ordinary skill in the art should also appreciate that the methods and systems of the application may be practiced in embodiments other than those described herein. For example, while the invention is presented in the context of infrared signals, receivers adapted to process control signals of any kind are within the scope of the invention. It will be understood that the foregoing is only illustrative of the invention disclosed herein, and that various modifications can be made by those skilled in the art without departing from the scope and spirit of the invention or inventions.

What is claimed is:

1. A receiver comprising:
   a sensor for receiving a signal;
   a band-pass filter in communication with the sensor for filtering the signal;
   a demodulator in communication with the band-pass filter for demodulating the filtered signal; and
   a processor in communication with the band-pass filter and the demodulator for attempting to distinguish the demodulated signal from noise, wherein the processor is configured to transmit a confirmation signal to the band-pass filter when the demodulated signal is distinguishable from noise, wherein the band-pass filter has a center frequency, wherein the band-pass filter is configured to update the center frequency to an updated center frequency when the band-pass filter receives the confirmation signal from the processor, wherein the signal is modulated at a carrier frequency, and wherein the updated center frequency is operationally equivalent to the carrier frequency.

2. The receiver of claim 1, further comprising:
   a non-volatile storage for storing the updated center frequency.

3. The receiver of claim 1, wherein the demodulated signal is distinguishable from noise if the signal has a predetermined transmission format.

4. The receiver of claim 3, wherein the predetermined transmission format is an infrared transmission format.

5. The receiver of claim 1, wherein the processor is configured to distinguish the demodulated signal from noise when the demodulated signal has a threshold number of bytes that correspond to a predetermined transmission format.

6. The receiver of claim 1, wherein the sensor is an infrared sensor.

7. The receiver of claim 1, wherein the processor is configured to distinguish the demodulated signal from noise when the demodulated signal comprises a threshold number of bytes that are received and understood by the processor.

8. The receiver of claim 1, wherein the processor is further configured to decode the demodulated signal when the demodulated signal is distinguishable from noise.

9. A method for receiving infrared signals comprising:
   receiving an infrared signal having a modulation frequency;
   filtering the infrared signal based on a center frequency;
   demodulating the filtered infrared signal;
   evaluating the demodulated signal to determine whether the demodulated signal comprises a predetermined transmission format; and
   updating the center frequency to a new center frequency that is operationally equivalent to the modulation frequency when the evaluated signal comprises the predetermined transmission format.

10. The method of claim 9, wherein filtering includes filtering the infrared signal based on a bandwidth.

11. The method of claim 9, wherein updating includes setting the center frequency to a value substantially equal to the modulation frequency.

12. The method of claim 9 further comprising decoding the evaluated signal when the evaluated signal comprises the predetermined transmission format.

13. A band-pass filter comprising:
    a filter module having a center frequency;
    an input module for receiving an infrared signal modulated at a carrier frequency; and
    a filter processing module for updating the center frequency to a new center frequency that is operationally equivalent to the carrier frequency when the filter processing module determines that the infrared signal comprises a predetermined transmission format.

14. A non-transitory computer readable medium that stores instructions executable by a processor of an electronic device to cause the electronic device to perform a method for filtering a signal, the method comprising:
    receiving an infrared signal modulated at a carrier frequency;
    filtering the infrared signal based on a center frequency;
    demodulating the filtered infrared signal;
    evaluating the demodulated signal to determine whether the demodulated signal comprises a predetermined transmission format; and
    updating the center frequency to a new center frequency that is operationally equivalent to the carrier frequency when the evaluated signal comprises the predetermined transmission format.

15. The non-transitory computer-readable medium of claim 14, wherein the updating the center frequency comprises updating the center frequency in real-time.

16. The non-transitory computer-readable medium of claim 14, wherein the updating the center frequency comprises updating the center frequency automatically.

* * * * *